(12) United States Patent
Misra et al.

(10) Patent No.: US 7,171,662 B1
(45) Date of Patent: Jan. 30, 2007

(54) SYSTEM AND METHOD FOR SOFTWARE LICENSING

(75) Inventors: Pradyumna K. Misra, Redmond, WA (US); Bradley J. Graziadio, Redmond, WA (US); Terence R. Spies, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 09/724,703

(22) Filed: Nov. 28, 2000

Related U.S. Application Data

(63) Continuation of application No. 09/040,813, filed on Mar. 18, 1998, now Pat. No. 6,189,146.

(51) Int. Cl.
*G06F 9/445* (2006.01)
*H04L 9/00* (2006.01)

(52) U.S. Cl. .............. 717/177; 717/174; 717/175; 717/176; 705/59; 713/176; 713/187

(58) Field of Classification Search ........ 717/168–178; 308/278, 300; 705/1, 55, 59; 380/94; 713/201, 713/176, 187
See application file for complete search history.

(56) References Cited

U.S. PATENT DOCUMENTS

| | | | | |
|---|---|---|---|---|
| 4,924,378 A | | 5/1990 | Hershey et al. ............. 713/201 |
| 5,138,712 A | * | 8/1992 | Corbin ....................... 713/200 |
| 5,204,897 A | | 4/1993 | Wyman ......................... 380/4 |
| 5,343,524 A | | 8/1994 | Mu et al. ...................... 380/4 |
| 5,390,297 A | * | 2/1995 | Barber et al. ............... 713/201 |
| 5,553,143 A | | 9/1996 | Ross et al. .................. 380/25 |
| 5,671,412 A | * | 9/1997 | Christiano ............... 707/104.1 |
| 5,724,425 A | * | 3/1998 | Chang et al. ................ 705/52 |
| 5,745,879 A | * | 4/1998 | Wyman ......................... 705/1 |
| 5,752,041 A | * | 5/1998 | Fosdick ...................... 717/178 |
| 5,790,677 A | | 8/1998 | Fox et al. .................... 380/24 |
| 6,005,935 A | * | 12/1999 | Civanlar ..................... 705/51 |
| 6,049,612 A | * | 4/2000 | Fielder et al. ............... 380/44 |

(Continued)

*Primary Examiner*—Kakali Chaki
*Assistant Examiner*—William H. Wood
(74) *Attorney, Agent, or Firm*—Lee & Hayes, PLLC

(57) ABSTRACT

A software licensing system includes a license generator located at a licensing clearinghouse and at least one license server and multiple clients located at a company or entity. When a company wants a software license, it sends a purchase request (and appropriate fee) to the licensing clearinghouse. The license generator at the clearinghouse creates a license pack containing a set of one or more individual software licenses. To prevent the license pack from being copied and installed on multiple license servers, the license generator assigns a unique license pack ID to the license pack and associates the license pack ID with the particular license server in a master license database kept at the licensing clearinghouse. The license generator digitally signs the license pack and encrypts it with the license server's public key. The license server is responsible for distributing the software licenses from the license pack to individual clients. When a client needs a license, the license server determines the client's operating system platform and grants the appropriate license. To prevent an issued license from being copied from one client machine to another, the software license is assigned to a specific client by including a client ID within the license. The software license also has a license ID that is associated with the client ID in a database record kept at the license server. The license server digitally signs the software license and encrypts it using the client's public key. The license is stored locally at the client.

20 Claims, 8 Drawing Sheets

U.S. PATENT DOCUMENTS

| | | | |
|---|---|---|---|
| 6,056,786 A * | 5/2000 | Rivera et al. | 717/168 |
| 6,105,069 A * | 8/2000 | Franklin et al. | 709/229 |
| 6,188,995 B1 * | 2/2001 | Garst et al. | 705/59 |
| 6,189,146 B1 * | 2/2001 | Misra et al. | 705/59 |
| 6,233,567 B1 * | 5/2001 | Cohen | 705/59 |
| 6,343,280 B2 * | 1/2002 | Clark | 705/55 |

* cited by examiner

SYSTEM AND METHOD FOR SOFTWARE LICENSING

RELATED APPLICATIONS

This is a continuation of U.S. patent application Ser. No. 09/040,813, filed Mar. 18, 1998 now U.S. Pat. No. 6,189,146.

TECHNICAL FIELD

This invention relates to systems and methods for licensing software. This invention further relates to systems and methods for enforcing software licenses.

BACKGROUND

Software licensing has historically been based on a "trust" model in which the user (i.e., licensee) is presumed to be honest and trustworthy and to abide by the legal requirements of the license. Under the trust model, a software license typically accompanies a software product to explain the terms of use. For instance, the software license might dictate that the program code is to be installed on only one computer, and may be used to make one backup copy.

Common types of licenses include "shrink wrap" licenses, "online" licenses, and "site" licenses. A "shrink wrap" license is a license that accompanies each software product that is sold individually in a shrink-wrapped package through retail stores. The user is typically assumed to accept the terms of the shrink wrap license upon breaking the seal of the package, or the container that holds the disk itself.

An "online" license is one that accompanies software products that are downloaded online, such as from the Internet. The license is typically presented to the user prior to downloading the code. The user is presented with a choice to accept or reject the license. If the user accepts the license (e.g., by clicking an "Accept" button on the screen), the user is presumed to have accepted the terms of the license and the code is downloaded to the user's computer.

A "site" license is a single license that allows installation of multiple copies of software on many different computers at a particular site or many sites. It is commonly used to sell software to corporations, firms, or other entities having many computers. The purchaser pays for a certain number of copies (e.g., hundreds or thousands), and the site license enables the purchaser to install that many copies on ifs computers. The site license is beneficial because the software vendor need not supply a large number of program disks, but merely supplies one or a few copies of the software and lets the purchaser install the copies without violating the agreement.

Each of the above license arrangements assumes that the purchaser is honest. The software purchaser must abide by the license terms in order to legally use the software. If the purchaser fails to abide by the provisions, the purchaser can be charged with civil and criminal violations.

However, enforcement of such licenses is impractical, if not impossible. Unscrupulous users might make multiple copies of the software code and install it on more computers than the license allows. Yet, software vendors cannot begin to monitor these abuses because they occur in the privacy of the home or company. Thus, it is believed that the software industry loses a large percentage of revenues each year simply due to illegitimate use of software by the licensees. This loss does not even account for the problems of overseas pirating.

Another problem with conventional software licensing practices concerns internal monitoring and bookkeeping on the part of large-site licensees. In most cases, the licensees want to comply with the terms of the software licenses, but are unable to adequately track the software as it is used throughout the site. For example, a large corporation might purchase several thousand copies of the software and begin installing the copies. However, computers and personnel change over time and it is difficult to centrally monitor how many copies have been installed, whether the copies have expired, whether they need upgrading, and so forth.

Accordingly, there is a need to develop a new approach to licensing software in a manner that assures that the terms are being meet and assists the licensee with monitoring whether it is in compliance with the software license.

SUMMARY

This invention concerns a system and method for licensing software. The system and method provides confidence to the vendor that the software license is being complied with, while also assisting the purchaser in monitoring its own compliance with the license.

According to one aspect of this invention, computer software licenses are electronically issued as digital certificates that can be distributed in one-to-one correlation with individual client computers and traced to an issuing authority.

According to another aspect, the system includes a license generator located at a licensing clearinghouse and at least one license server and multiple clients located at or affiliated with a company or other entity. Because the clients might not have network connectivity to the license server, one or more intermediate servers may act as an intermediary for the clients. These intermediate servers are otherwise common servers that provide resources to clients, but with the added ability to facilitate connectivity to the license server for purposes of distributing software licenses to the clients.

When a company wants a software license, it sends a purchase request (and an appropriate fee) to the licensing clearinghouse. The license generator at the licensing clearinghouse creates a license pack containing a set of one or more individual software licenses. To prevent the license pack from being copied and installed on multiple license servers, the license generator assigns a unique license pack ID to the license pack and associates the license pack ID with the license server in a master license database kept at the licensing clearinghouse. The license generator also digitally signs the license pack and encrypts it with the license server's public key. The license generator sends the license pack to the license server using standard communications, such as over a data communication network (e.g., Internet) or via a portable data medium (e.g., floppy diskette, CD-ROM, etc.).

The license server verifies the license generator's digital signature on the license pack and if valid, installs the license pack for subsequent distribution of licenses. The license server maintains an inventory of software licenses that have been purchased from the licensing clearinghouse. The license server is responsible for distributing the software licenses contained in the license pack to individual clients. It monitors the software licenses that have been granted to clients and continues to distribute licenses as long as non-assigned licenses remain available. Once the supply of non-assigned licenses is exhausted, however, the license server can no longer grant licenses to the clients and the customer must purchase a new pack from the license clearinghouse.

When a client connects to a server, the client presents a valid license (if it has one). If the client does not have an appropriate license, the server assists the client in obtaining a license from the license server. This provides an automated mechanism for clients to obtain and license server to distribute licenses to clients.

When a license is requested, the license server initially checks if the requesting client has already been issued a license. When this situation is detected, the license server issues the existing license to the client. This is actually reissuing of the same license that was previously issued. This allows the client to gracefully recover licenses when they are lost.

In one implementation, the license server determines an appropriate type of license based in part on the client's operating system platform. The license server derives the platform information by establishing a trust relationship with the client and then querying its platform type. If a software license is available for allocation, the license server grants a software license that is appropriate for the client's platform.

To prevent an issued license from being copied from one client machine to another, the software license is assigned to a specific client by including its client ID within the license. The software license also has a corresponding license ID that is associated with the client ID in a database record kept at the license server.

The license server digitally signs the software license. The license is passed to the client, where it is stored in a local cache at the client. Once a client has obtained a license, it is responsible for managing the storage of that license.

BRIEF DESCRIPTION OF THE DRAWINGS

The same reference numbers are used throughout the drawings to reference like components and features.

DETAILED DESCRIPTION

The following discussion assumes that the reader is familiar with public key cryptography. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Figure 1:
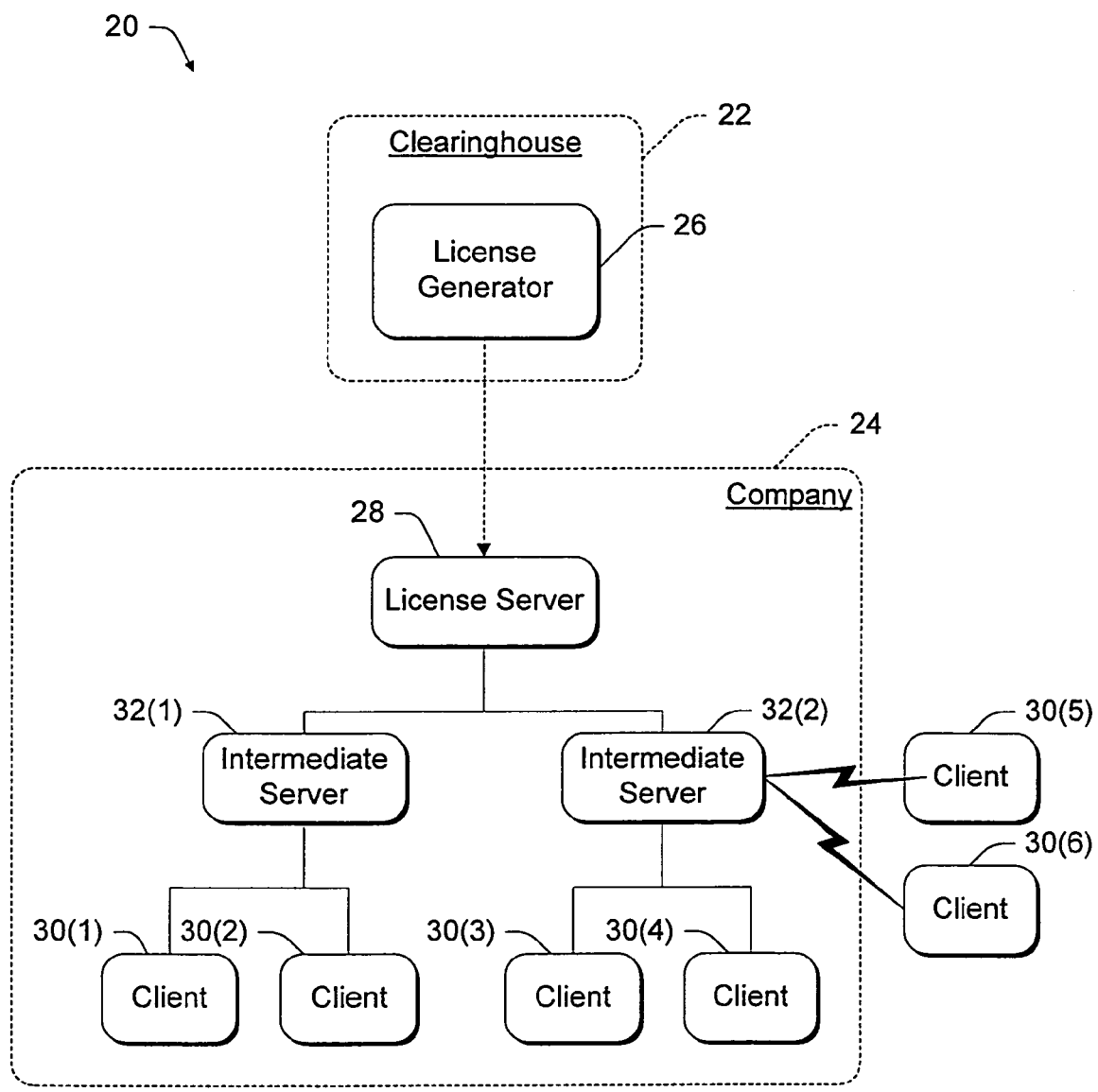
FIG. 1 shows a software licensing system.

FIG. 1 shows a system 20 for licensing software. The system 20 has a licensing clearinghouse 22 that creates and issues valid software licenses to one or more companies, firms, agencies, or other entities, as represented by company 24. The clearinghouse 22 is a separate entity from the company 24. Examples of the clearinghouse include a software manufacturer, a software vendor, or a third party agent that is authorized to issue software licenses on behalf of the software manufacturer or vendor.

The company 24 contacts the clearinghouse 22 when it desires to purchase a software license to run software on the company computers. The clearinghouse 22 has a license generator 26 that creates a "license pack" containing a set of one or more individual software licenses. The clearinghouse 22 encrypts the license pack using the destination license server's public key and digitally signs the license pack with a digital signature unique to the clearinghouse.

The company 24 has at least one designated license server 28. The license pack is sent to the company 24 using standard communications, such as over a data communication network (e.g., Internet) or via a portable data medium (e.g., floppy diskette, CD-ROM, etc.), and installed on the license server 28.

The license server 28 is responsible for distributing the software licenses contained in the license pack to individual clients, as represented by clients 30(1)–30(6). The license server 28 verifies the license generator's digital signature on the license pack, decrypts the contents of the license pack, and stores the individual software licenses for subsequent distribution to individual clients.

The license server 28 maintains an inventory of software licenses that have been purchased from the licensing clearinghouse 22. The license server 28 monitors the software licenses that have been granted to clients. The license server 28 can distribute licenses to new clients as long as it has available non-assigned licenses. Once the supply of non-assigned licenses is exhausted, however, the license server 28 can no longer grant licenses to the clients. The only way for the license server 28 to obtain new non-assigned licenses is to purchase a license pack from the clearinghouse 22.

Because the clients might not have network connectivity to the license server 28, one or more intermediate servers, as represented by servers 32(1) and 32(2), can act as an intermediary for the clients. Each intermediate server 32 is a common server that provides conventional resources to the clients. In addition, each intermediate server 32 has network connectivity to the license server 28 to facilitate license distribution from the license server 28 to the clients 30. The intermediate servers 32 accept software licenses issued by the license server 28; therefore, the intermediate server associations determine the scope of the license pack to a particular license server.

The clients 30 may be directly coupled to the intermediate servers 32 via a LAN (local access network) or WAN (wide area network), as represented by clients 30(1)–30(4). Additionally, the clients 30 may be indirectly coupled to the intermediate servers 32, such as using a dialup connection as represented by clients 30(5) and 30(6).

When a client 30 connects to the intermediate server 32, it must present a valid license. If the client does not have an appropriate license, the intermediate server 32 assists the client in obtaining a license from the license server 28. This provides an automated mechanism for distributing licenses to clients. The license server 28 initially checks if the requesting client already has been issued a license. When this situation is detected, the license server 28 issues the existing license to the client. This allows the client to gracefully recover licenses when they are lost.

In one particular implementation, the license server 28 determines an appropriate type of license based in part on the client's platform operating system type. The license server 28 derives the platform information by establishing a trust relationship with the client 30 and then querying its platform type. Once a client 30 has obtained a license, it is responsible for managing the storage of that license. The platform challenge process is described below in more detail.

Exemplary Computer Used to Implement Servers and/or Client

The license generator 26, license server 28, and intermediate server 32 are preferably implemented as computer servers, such as Windows NT servers that run Windows NT server operating systems from Microsoft Corporation or UNIX-based servers. It is noted, however, that the license generator 26 and license server 28 may be implemented using other technologies, including mainframe technologies, as long as they share an inter-operable communication mechanism like remote procedure call (RPC) and these systems are secure.

The clients 30 can be implemented as many different kinds of computers, including a desktop personal computer, a workstation, a laptop computer, a notebook computer, a handheld PC, and so forth. The clients 30 may further represent a terminal device, which is a low cost machine with limited local processing and local memory. The terminal device includes a display, a keyboard, a mouse (optional), limited computer resources like memory, and enough intelligence to connect to an intermediate server. All applications run at the server. The terminal merely provides a connection point to the server-based processing.

The clients 30 might also represent a network-centric computer, such as a Network Computer (or NC) or a Net PC.

Figure 2:
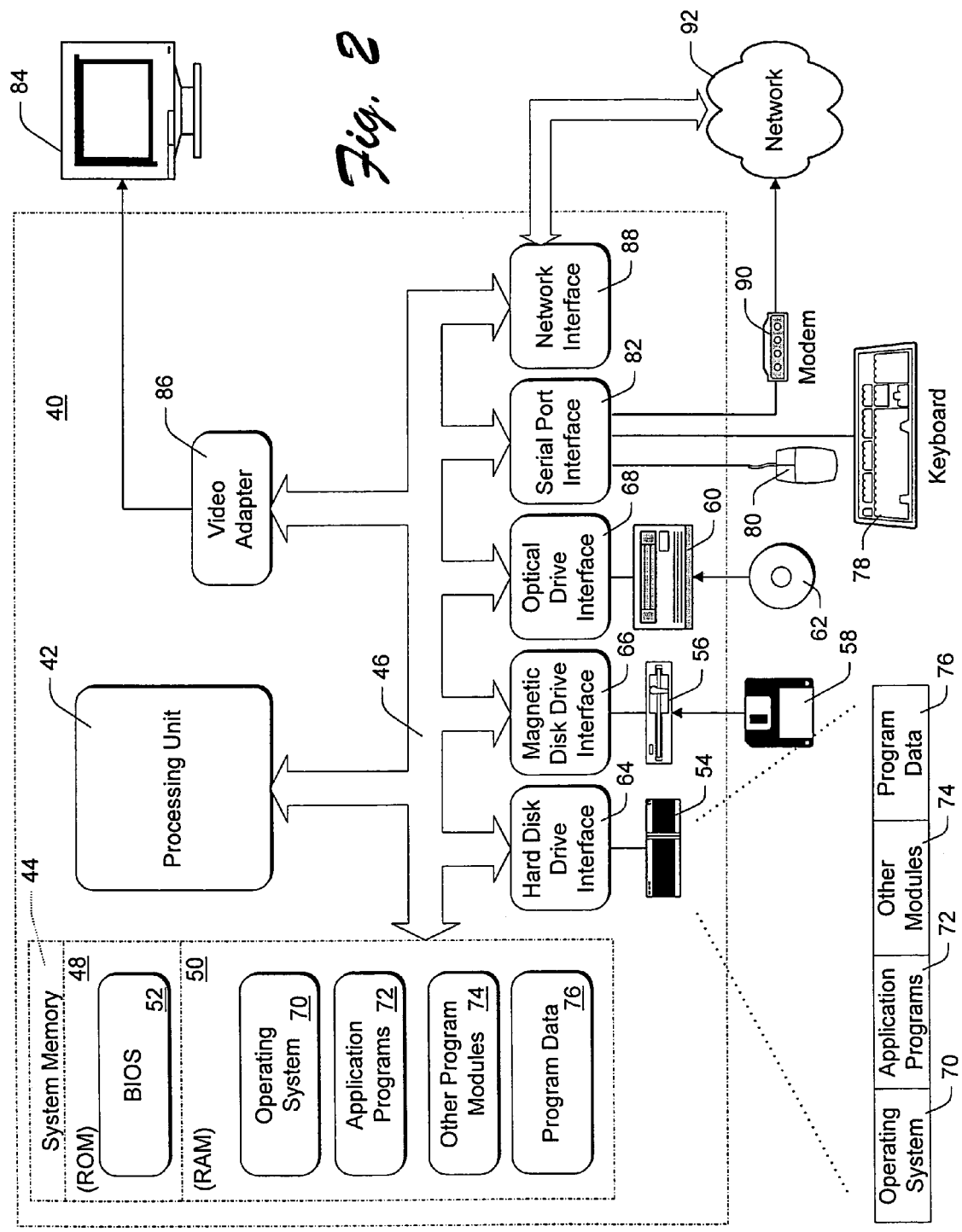
FIG. 2 shows a block diagram of a computer used to implement the software licensing system.

FIG. 2 shows an example implementation of a computer 40, which can be used to implement the license generator 26, license server 28, and intermediate server 32. The server 40 includes a processing unit 42, a system memory 44, and a system bus 46 that interconnects various system components, including the system memory 44 to the processing unit 42. The system bus 46 may be implemented as any one of several bus structures and using any of a variety of bus architectures, including a memory bus or memory controller, a peripheral bus, and a local bus.

The system memory 44 includes read only memory (ROM) 48 and random access memory (RAM) 50. A basic input/output system 52 (BIOS) is stored in ROM 48.

The computer 40 has one or more of the following drives: a hard disk drive 54 for reading from and writing to a hard disk or hard disk array, a magnetic disk drive 56 for reading from or writing to a removable magnetic disk 58, and an optical disk drive 60 for reading from or writing to a removable optical disk 62 such as a CD ROM or other optical media. The hard disk drive 54, magnetic disk drive 56, and optical disk drive 60 are connected to the system bus 46 by a hard disk drive interface 64, a magnetic disk drive interface 66, and an optical drive interface 68, respectively. The drives and their associated computer-readable media provide nonvolatile storage of computer readable instructions, data structures, program modules and other data for the computer 40.

Although a hard disk, a removable magnetic disk 58, and a removable optical disk 62 are described, other types of computer readable media can be used to store data. Other such media include magnetic cassettes, flash memory cards, digital video disks, Bernoulli cartridges, random access memories (RAMs), read only memories (ROM), and the like. Additionally, the computer 40 may be configured to serve data stored on an independent storage systems, such as disk array storage systems.

A number of program modules may be stored on the hard disk, magnetic disk 58, optical disk 62, ROM 48, or RAM 50. These programs include a server operating system 70, one or more application programs 72, other program modules 74, and program data 76. The operating system 70 is preferably a Windows-brand operating system such as Windows NT, Windows 95, Windows CE or other form of Windows. The operating system 70 may alternatively be other types, including Macintosh and UNIX-based operating systems.

A user may enter commands and information into the computer 40 through input devices such as a keyboard 78 and a mouse 80. Other input devices (not shown) may include a microphone, joystick, game pad, satellite dish, scanner, or the like. These and other input devices are connected to the processing unit 42 through a serial port interface 82 that is coupled to the system bus 46, but may alternatively be connected by other interfaces, such as a parallel port, game port, or a universal serial bus (USB).

A monitor 84 or other type of display device is also connected to the system bus 46 via an interface, such as a video adapter 86. The computer 40 has a network interface or adapter 88, a modem 90, or other means for establishing communications over a network 92.

System Architecture

Figure 3:
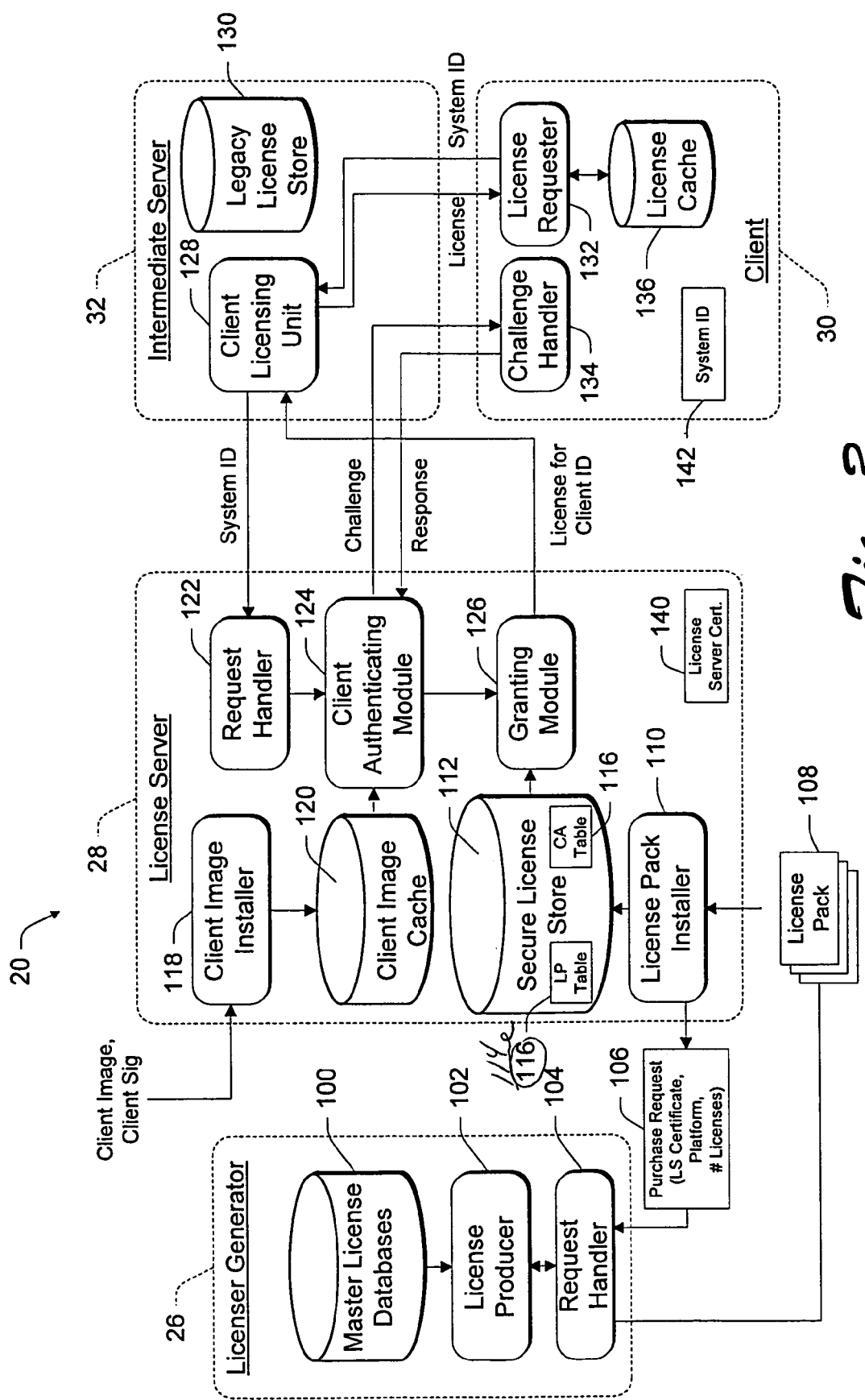
FIG. 3 shows a functional block diagram showing software components and databases that implement the software licensing system.

FIG. 3 shows an exemplary software/hardware architecture of the system 20. The architecture includes four components: a license generator 26, a license server 28, a client 30, and an intermediate server 32. The license generator 26 produces license packs for a fee and the license server 28 consumes the licenses by installing them. In turn, the license server 28 distributes a license to the client 30 with the help of the intermediate server 32. The client 30 then uses the license to gain access to the resources provided by the intermediate server 32.

The entity or organization that owns, or is responsible for, the license server 28 registers itself with an independent certifying authority that is trusted by both the organization and the clearinghouse. The organization submits information identifying itself and various license servers to the certifying authority. The certifying authority performs a verification analysis of the organization to verify that it is a real entity and that the identification information is true and accurate. The certifying authority issues a certificate to the organization. The certificate contains the public key of the organization (or particular license server), which is signed by the certifying authority. This certificate becomes the license server's certificate during the initial purchase request process when the license server requests a license pack from the clearinghouse.

Similarly, the clearinghouse also registers with the certifying authority to receive a public certificate. The clearinghouse certificate contains the clearinghouse's public key, signed by the certifying authority.

The license generator 26 has a master license database 100, a licensing producer 102, and a request handler 104. The request handler 104 receives a purchase request 106 from the license server 28 asking to purchase one or more license packs. The purchase request includes information pertaining to the licenses and license server 28. For example, the purchase request might contain such information as a license server ID, the license server's certificate (which contains the license server's public key), a client's platform type, the quantity of licenses desired, a product ID, and a list of features that the licenses should enable. Additional information about a customer (e.g., name, contract number, etc.) may also be requested for purposes of tracking and report generation. This information is stored in the master license database 100.

In response to the request, the license producer 102 generates one or more license packs 108, each of which contains a set of one or more non-assigned licenses that are purchased from the license clearinghouse. The license generator 26 creates licensing packs in a way that prevents them from being copied and installed on multiple license servers 28 or being applied multiple times on the same server. In the preferred implementation, this is accomplished using IDs and cryptographic tools. The license producer 102 assigns a unique license pack ID to each license pack and associates the license pack ID with the license server 28 in the master license database 100. The license pack ID is embedded in the license pack 108. This prevents users from multiplying the number of licenses they purchase by installing the same license pack multiple times on the same license server.

The license generator 26 encrypts the license packs 108 with the license server's public key to ensure protected transport to the license server 28 and to ensure that only the license server 28 can open the packs 108. The license generator 26 also digitally signs the license packs 108 with a private signing key of the license generator 26. The license server 28 uses this signature to validate that the license pack came from an authorized license generator and has not been altered.

The license pack 108 is a data structure that contains various information to enable the license server to distribute software licenses. The data structure contains fields with the licensing information. Table 1 shows the data fields of a license pack data structure.

TABLE 1

License Pack Contents

| Field | Description/Purpose |
|---|---|
| Message Version | An ID used to distinguish different versions of the data structure. |
| License Pack Serial Number | A serial number assigned by the license generator to prevent the license pack from being installed multiple times on the same license server. |
| Issue Date | The date the license pack is issued by the clearinghouse. |
| First Active Date | The date on which the licenses within the license pack can first be used. |
| Expiration Date | The date on which the licenses within the license pack will expire. A license could be set such that it does not expire. |
| Begin Serial Number | The beginning serial number for the licenses in the license pack. The number is used to assign a unique serial number to each license within the license pack. |
| Quantity of Licenses | The number of licenses contained within the license pack. |
| Number of Human Descriptions | The number of Human descriptions included for the license pack. |
| Array of Human Descriptions (Locale, Description) | Locale—Identifies the locale for the Human Description. Human Description—A description of the contents of the license pack in a localized form. |
| Manufacturer | Identity of the manufacturer of the product being licensed. |

TABLE 1-continued

License Pack Contents

| Field | Description/Purpose |
|---|---|
| Manufacturer-Specific Product Data | Manufacturer-dependent information used to identify the product. As an example, this data might include: 1. Product Family Code 2. Product Version 3. License Type |
| Signature | Digital signature generated by the license generator using the clearinghouse private key. |
| Clearinghouse's Public Key Certificate | The certificate issued to the clearinghouse and containing the clearinghouse's public key. This public key is used to sign the encrypted license pack. |

One parameter of the purchase request and subsequent license pack is the client platform type. As one possible implementation, the system 20 is configured to reliably recognize four different platform types: Windows, Non-Windows, Legacy, and Direct-Connect. A "Windows"-type platform means the client computer runs a 32-bit version of Microsoft Windows operating system (e.g., Windows 95, Windows 98, Windows NT, etc.). A "Non-Windows"-type platform means the client computer runs an operating system other than a Windows brand operating system. A "Legacy"-type platform indicates that the client runs an older version of an operating system that cannot be adequately determined by the license server as a "Windows"-type or a "Non-Windows"-type. A "Direct-Connect" platform means the client is a terminal that attaches directly to the server's bus and thus, all of the operating system functionality is provided directly by the server. Table 2 summarizes the platform types.

TABLE 2

Platform Types

| Platform Type | Description |
|---|---|
| Windows | Authenticated client platforms that are Win32-based. |
| Non-Windows | Authenticated client platforms that are not Win32-based. |
| Legacy | Clients that are implemented with older operating systems that are incapable of fielding a client platform challenge from the license server. There is no way of determining whether or not the client's platform is Win32 capable. |
| Direct-Connect | Multi-console clients that are attached directly to the server's BUS. These clients derive the operating system capabilities from the server itself. |

The license server 28 has a license pack installer 110 and a secure license store 112. The license pack installer 110 installs the license pack(s) 108 received from the license generator on the secure license store 112. The license pack installer 110 may also be used to order the license packs, when such purchase requests are made electronically.

The license pack is stored in a secured database. A library of routines for adding, removing, querying, upgrading and extracting licenses are used to manage the licenses within the license store. As noted above, the license packs are encrypted using the license server's private key to prevent users from tampering with the licenses or moving them to another license server. License store APIs (application program interfaces) are used to encrypt the licenses as they are placed on the secure license store 112 and to decrypt the licenses as they are removed from the store.

To prevent the same licenses from being applied multiple times on the same license server, each license pack 108 contains a unique license pack ID assigned by the license generator 26 when the license pack is created. The licenses are stored in the license store 112 based on the license pack ID.

The license store 112 contains two tables: a license pack (LP) table 114 and a client assignment (CA) table 116. The license pack table 114 records information pertaining to the license packs 108. The license pack table 114 is indexed using the license pack ID, which enables quick access and a convenient way to check if a particular license pack is already installed in the secure store.

Table 3 shows the fields in the license pack table 114.

TABLE 3

License Pack Table

| Field | Description |
|---|---|
| License Pack ID | A unique identifier assigned by the license generator. |
| Quantity | The number of software licenses contained in the license pack. |
| Number Assigned | The number of software licenses that have been assigned to clients. |
| First Active Date | The date on which the licenses within the license pack can first be used. |
| Expiration Date | The date on which the software licenses in the license pack will expire. |
| Begin Serial Number | The beginning serial number for the licenses in the license pack. The number is used to assign a unique serial number to each license within the license pack. |
| Product-Specific Attributes | Product-dependent information to indicate specific features of a product. As an example, this date might include:<br>1. Product ID<br>2. Product Flags<br>3. Platform Type |

The number assigned field need not be kept, but it helps eliminate the need to count the number of assigned licenses each time an administrator wants to determine how many free licenses are available.

The client assignment table 116 contains a list of all licenses that have been distributed to the clients. Each record in the client assignment table 116 is assigned a unique license ID. The license ID serves two purposes: (1) it allows the table 116 to be indexed and (2) it provides a license tracking mechanism for the client. The client assignment table 116 also contains the license pack ID from which each license is derived.

Table 4 shows the fields in the client assignment table 116.

TABLE 4

Client Assignment Table

| Field | Description |
|---|---|
| License ID | A unique identifier assigned by the license server to each software license, based on the begin serial number. |
| License Pack ID | The unique identifier assigned by the license generator. |
| Client ID | A unique identifier of the client to which the software license is granted. |
| Issue Date | The date on which the software license is issued to the client. |

The license pack ID fields in the license pack table 114 and the client assignment table 116 can be used to join the tables in a one-to-many relationship; that is, one record identified in the license pack table 114 to many records in the client assignment table 116 as software licenses are issued to clients. This joinder yields a list of all software licenses assigned to clients from a given license pack. The client ID field enables the administrator to query all licenses for a particular client.

In this manner, the two tables 114 and 116 help the company's license administrator track the number of licenses available, the number installed, and which clients have which licenses. This tracking mechanism is useful because the administrator can quickly determine whether the company is in compliance with the terms of the license. Additionally, the tracking mechanism allows the administrator to plan for purchasing of additional licenses.

With continuing reference to FIG. 3, the license server 28 also has a client image installer 118 and a client image cache 120. The client image installer 118 installs executable images and client signatures of authorized clients in the client image cache 120. The client images are used to challenge clients during software distribution. The reason that the entire client image is stored on the license server is to prevent a third party from replaying exchanges between client and server for platform challenge and response.

The client digital signatures are based on client information provided by the manufacturer (i.e., OEM). The OEM submits a client executable image to a third party, or to the software manufacturer of the server software, or to a signing authority (hereinafter, collectively referred to as the signing authority). The signing authority computes a value as a one-way function of a client executable image. Preferably, the signing authority hashes the image, or slices of the image, using a hashing algorithm to produce a hash value. The signing authority then signs the client image hash with a private key associated with the license server.

The client's digital signature is presented to a license server 28 when installing client images in the server's client image cache 120. The client image installer 118 has access to the corresponding public key, which is maintained at the license server, and uses this public key to verify the client's signature before installing the client image on the cache 120.

The license server 28 also has a request handler 122, a client authenticating module 124, and a granting module 126. The request handler 122 receives requests for software licenses from clients. The client request typically includes the client ID. The request handler 122 passes the request to the client authenticating module 124, which determines whether the client is authentic and able to receive a software license.

As part of the authentication process, the client authenticating module 124 initiates a platform challenge requesting a client executable image from the client 30. One preferred approach to performing a platform challenge is described below in more detail under the sub-heading "Platform Challenge".

The client authenticating module 124 compares the client executable image received from the client to the client executable image stored in the client image cache 120. The client is deemed authentic if the two images match. The client authenticating module 124 informs the granting module 126 when the client is authenticated.

The granting module 126 grants a software license from the secure license store 112 to the authenticated client. To prevent an issued license from being copied from machine to machine, the software license is assigned to a specific client by assigning a client ID to the license and including that ID within the license. The software license is also given a license ID. The license ID is associated with the client ID in the client assignment table 116 to track which client receives the issued license.

The license server 28, based on information derived from the license pack, fills in fields of a license data structure at the time the license is issued. As one example, the license data structure is implemented using an X.509 certificate, which is well known in the art. The license server 28 then digitally signs the software license using a signing key that is not disclosed to the client. Table shows the data fields of a software license data structure.

TABLE 5

Software License Contents

| Field | Description/Purpose |
|---|---|
| Version | Identifies the "data structure" version of the software license so newer licenses can be used on older servers. |
| License ID | A unique ID assigned to the software license by the license server at the time of issuance to the client. |
| Client ID | The unique identifier of the client to which the software license is assigned. |
| Issue Date | The date on which the software license is assigned to the client. |
| Expiration Date | The date on which the software licenses in the license pack will expire. |
| Product-Specific Attributes | Product-dependent information to indicate specific features of a product. As an example, this date might include:<br>1. Product ID<br>2. Product Flags<br>3. Platform Type |
| Signature | Digital signature generated by the license generator using the clearinghouse private key. |
| License Server's Certificate | The license server's public key in certificate form, as issued by the certifying authority. |

As part of the granting process, the client assignment table 116 is updated to reflect that a particular license having a specific license ID is issued to a particular client having a specific client ID. Additionally, the number assigned field in the license pack table 114 is updated to reflect that another license has been assigned to a client.

The license pack installer 110, client image installer 118, request handler 122, client authenticating module 124, and granting module 126 are preferably implemented as software programs executing on the license server 28. These software programs are preferably implemented as part of the operating system at the license server.

The intermediate server 32 acts as a go between for the client 30 and license server 28. The intermediate server is a full-service server that is used regularly by the client to perform normal tasks that are customary for the company or entity. But, the intermediate server is further equipped with a client licensing unit 128 to facilitate communication between the client 30 and license server 28. The intermediate server 32 also has a legacy license store 130, which stores licenses for clients whose platforms cannot generate a unique system ID.

The client 30 has a license requestor 132, a challenge handler 134, and a license cache 136. The license requestor 132 initiates the license requests for obtaining a software license from the license server 28. This involves connecting to the intermediate server 32 and presenting a software license and a client ID to the intermediate server 32. The client ID submitted by the client is validated against the client ID within the license. To prevent a client from simply looking within a license to find its associated client ID, the license server encrypts the software license With a key that is never disclosed to clients and hence the client is incapable of decrypting the software license. Furthermore, license tampering is prevented by digitally signing the software licenses when the license server issues them.

The client ID is passed onto the license server 28, which then initiates a platform challenge. The client's challenge handler 134 handles the platform challenge from the license server 28. It computes a response to the challenge that contains the client's image, which can be used by the license server 28 to authenticate the client.

If the client is deemed authentic, the license server downloads a software license to the client. The license server 28 encrypts the license using the client's public key and digitally signs the license. Additionally, the license generator assigns a unique license ID to the issued license. Because the licenses are tied to a specific client through a client ID, digitally signed by the license server and encrypted, the software licenses cannot be activated on other clients.

The license requestor 132 verifies the signature on the license to confirm that it came from the license server 28 and stores the software license in the license cache 136. It is the responsibility of the license requester 132 to manage the licenses stored in the cache 136. The licenses are organized in the license cache 136 according to information about the license issuing authority and product ID.

The license cache 136 is kept in persistent (non-volatile) storage. Clients that do not have persistent storage can be issued licenses as long as they can generate a unique client ID and can respond to the client platform challenge protocol. The licensing system handles this case in the same way it recovers lost licenses. On connect, the intermediate server contacts the license server for a new license. The license server realizes, through the system ID, that the license has already been issued. In this case, the old license is simply returned to the client. Clients that cannot generate a system ID or respond to the platform challenge protocol use the legacy licenses stored in the legacy license store 130 at the intermediate server 32.

The license requestor 132 and the challenge handler 134 are preferably implemented in software executing on the client 30. These software programs are preferably implemented as part of the client's operating system.

It is noted that FIG. 3 illustrates one possible implementation of the software licensing system 20. Other implementations are possible. As one example, the components associated with a client platform challenge may be removed. These components include the client image installer 118, the client image cache 120, and the client authenticating module 124 in the license server 28, and the challenge handler 134 in the client 30.

System IDs

One aspect of system 20 is the ability to generate unique identifiers for the servers and clients. These unique IDs include the license server ID in license server certificate 140 and the client's system ID 142 (collectively referred to as "System IDs"). The system 20 employs a per-seat licensing technique, in which licenses are associated with a particular client or machine (i.e., "seat" or "node"). The license server certificate 140 contains a unique ID for the license server 28, which is passed to the license generator during a request for a license pack. The client's system ID 142 is a unique identifier of the client computer. It is noted that the client ID assigned by the license server to a software license ma be client's system ID, although it will typically be a separate identifier created by the license server solely for tracking purposes.

As one possible implementation, the system IDs can be based on information collected form a computer's hardware and installed software. For example, hard disk volume numbers, network cards, registered software, video cards, and some microprocessors contain unique identifiers. On PCs, this information can be combined to uniquely identify a particular PC. Other information that might be used includes total RAM and floppy disk drive configuration. Because these components can be removed or replaced, thus changing the system ID, procedures for accepting system IDs allow for some variations. For instance, the procedures might allow for a few parameters to vary.

However, relying on a machine's hardware characteristics may not always be sufficient when generating unique machine IDs. For example, the hardware characteristics of some computers may not vary, so they would all generate the same machine ID. In these cases, manufacturers "brand" the computers with a unique identifier that it can be used to generate a unique machine ID. Client platforms that cannot generate a unique machine ID are still permitted to connect to an intermediate server and are deemed legacy platforms. Legacy licenses maintained in the legacy license store 130 are used for these machines.

Issuance of License Pack

Figure 4:
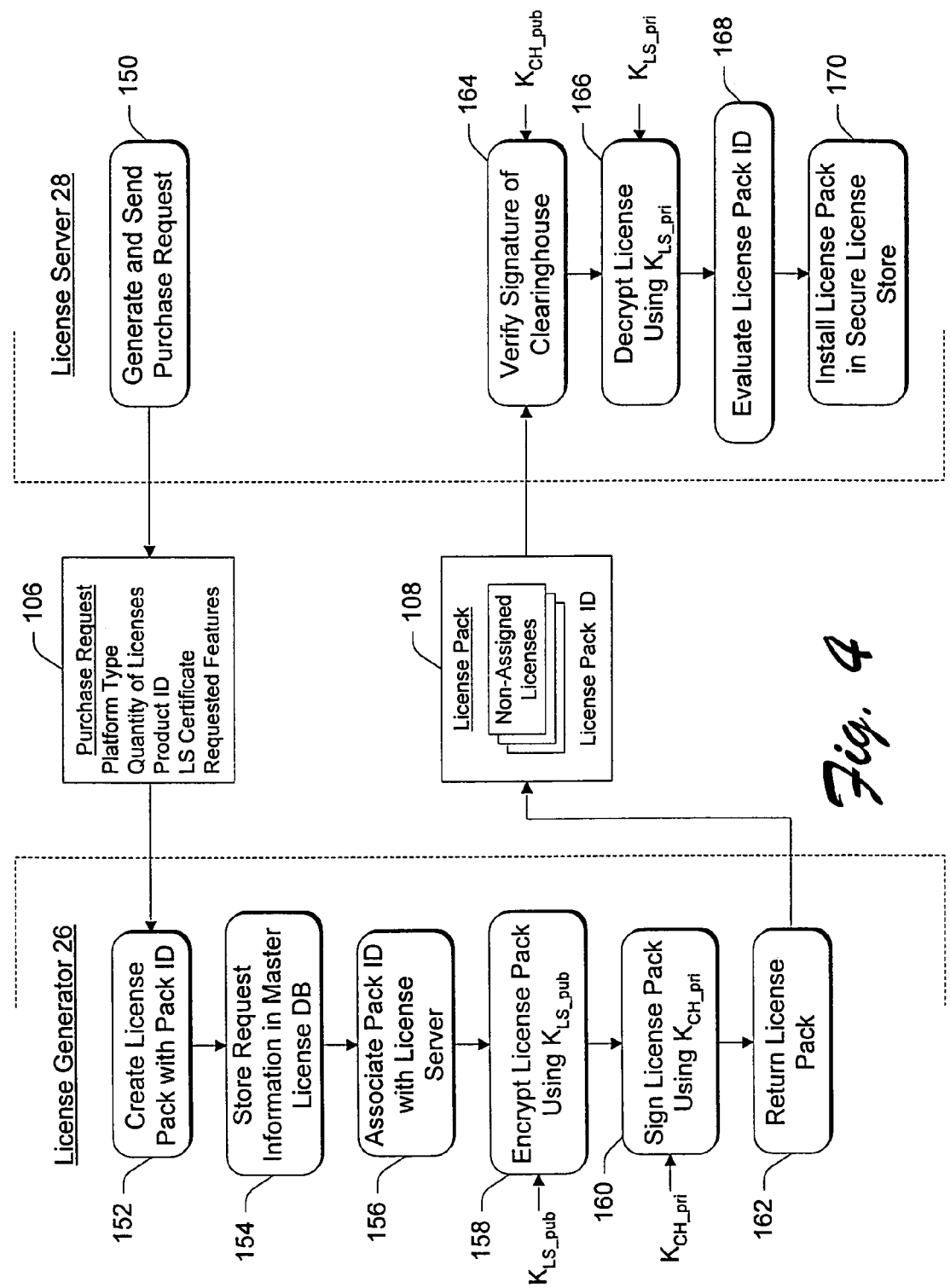
FIG. 4 shows steps in a method for issuing a license pack of individual licenses.

FIG. 4 shows steps in a method for requesting and issuing a license pack from a license generator. At step 150, the license server 28 generates and sends a purchase request 106 to an authorized license generator 26. The request 106 contains information used by the license generator 26 to issue one or more software license packs to the requesting license server 28. The purchase request 106 contains the platform type (see Table 2), the quantity of licenses desired, the product ID, the license server's certificate (containing the license server's public key $K_{LS\_pub}$ and the license server ID), and the list of features that the license should enable. The license server can submit this information electronically to the license generator via the Internet, modem, e-mail, on a floppy diskette, or other electronic means. Additionally, the administrator at the company or entity might submit a purchase request to the licensing clearinghouse 22 in writing on paper, or place an order orally by telephone. The license server 28 typically submits a licensing fee with the purchase request, or sometime following the initial communication.

After collecting the fee for the software licenses, the license generator 26 creates a license pack containing a set of one or more individual software licenses and assigns a unique license pack ID to the license pack (step 152 in FIG. 4). The license generator 26 stores the collected information in the master license database 100 (step 154). The information from the license server 28 is correlated within the database 100 to the license pack ID. In this manner, the license pack ID is associated with a particular license server having a specific license server ID (step 156).

The license generator 26 encrypts the license pack of software licenses using the license server's public key $K_{LS\_pub}$, thus binding the license pack to the requesting license server 28. The license generator 26 digitally signs the license pack using its (i.e., the clearinghouse's) private signing key $K_{CH\_pri}$ (step 160 in FIG. 4) and sends the license pack to the requesting license server 28.

The license pack 108 contains a set of one or more non-assigned licenses and the license pack ID. Table 1 lists the contents of the license pack 108.

At step 164 in FIG. 4, the license server 28 uses the clearinghouse's public signing key $K_{CH\_pub}$ to verify that the digital signature accompanying the license pack 108 belongs to the license generator 26 of clearinghouse 22 and that the license pack 108 has not been altered. If the signature is authentic and from a known clearinghouse, the license server 28 decrypts the license pack contents using its private key $K_{LS\_pri}$ (step 166). The license server 28 extracts the license pack ID and queries the secure license store 112 to see if it already contains the same license pack (step 168). If the license pack is new, the license server installs it on the secure license store 112 (step 170).

Distribution of Licenses

Client Connection

Figure 5:
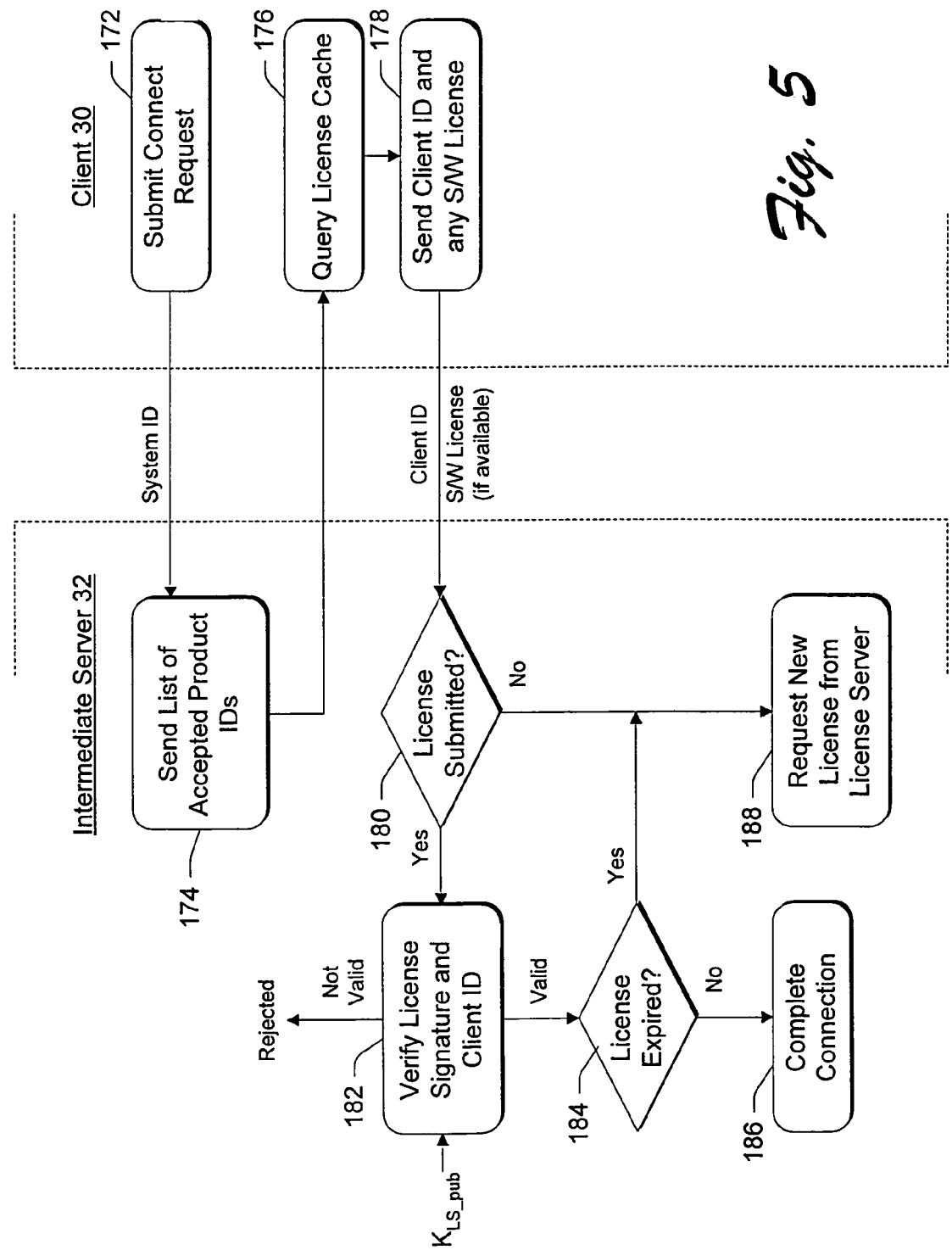
FIG. 5 shows steps in a method for initiating a connection between a client and a server and determining whether the client has a valid license.

FIG. 5 shows steps in a process that facilitates a client's initial connection to the intermediate server. The client connects to the intermediate server 32 to ask for services or data provided by the server. Prior to working with the client and providing access to files, the intermediate server 32 wants to verify first that the client has a valid software license issued by a recognized license server. The client 30 may or may not have a valid license, so the intermediate server makes an initial evaluation when the client attempts to connect. Generally, if the client 30 has a valid license, the client is permitted to connect and use the server's resources. If the client 30 offers an invalid license, the client is disconnected. If the client 30 does not offer a valid license or offers an expired license, the intermediate server 32 facilitates the process of obtaining a new software license.

At step 172, the client 30 submits a connection request to the intermediate server 32. The connection request includes the client's system ID that uniquely identifies the computer. In response, the intermediate server 32 passes a list of the product IDs required (step 174). In this manner, the intermediate server 32 limits its acceptance of software licenses to those that are issued by legitimate and authorized license servers.

With this information, the client 30 queries its license cache 136 to search for a suitable license from a license server that appears on the list (step 176 in FIG. 5). If a software license is found, the client 30 sends the software license to the intermediate server 32 along with the client ID; otherwise, the client 30 submits only a client ID (step 178). The software license contains the digital signature of the license server.

At step 180 in FIG. 5, the intermediate server 32 determines whether the client submitted a software license. If so, the intermediate server 32 verifies whether the digital signature belongs to an authorized license server and whether the license contains a valid client ID (step 182). The client ID is checked by extracting the client ID from the license (which was provided originally by the licensing server, as described below) and comparing it to the client ID received from the client. If the two match, the client ID passes.

If the digital signature or the client ID is not valid (i.e., the "not valid" branch from step 182), the software license is deemed invalid. The client's request for connection is then rejected and the client is disconnected. On the other hand, if the digital signature and the client ID are both valid (i.e., the "valid" branch from step 182), the intermediate server 32 checks if the license has expired (step 184), the connection is completed if the license is still valid i.e. has not expired and the client is allowed access to the services and files of the intermediate server (step 186).

In the event that the client 30 does not submit a valid license or submits an expired license, the intermediate server requests a new software license from the license server (step 188 in FIG. 5).

New License Grant

Software licenses are distributed to the client automatically by the license server. As discussed above, when a client 30 connects to an intermediate server 32, the client must present a valid license. If it cannot, the intermediate server acts as a proxy for the client and requests a license from its associated license server.

Figure 6:
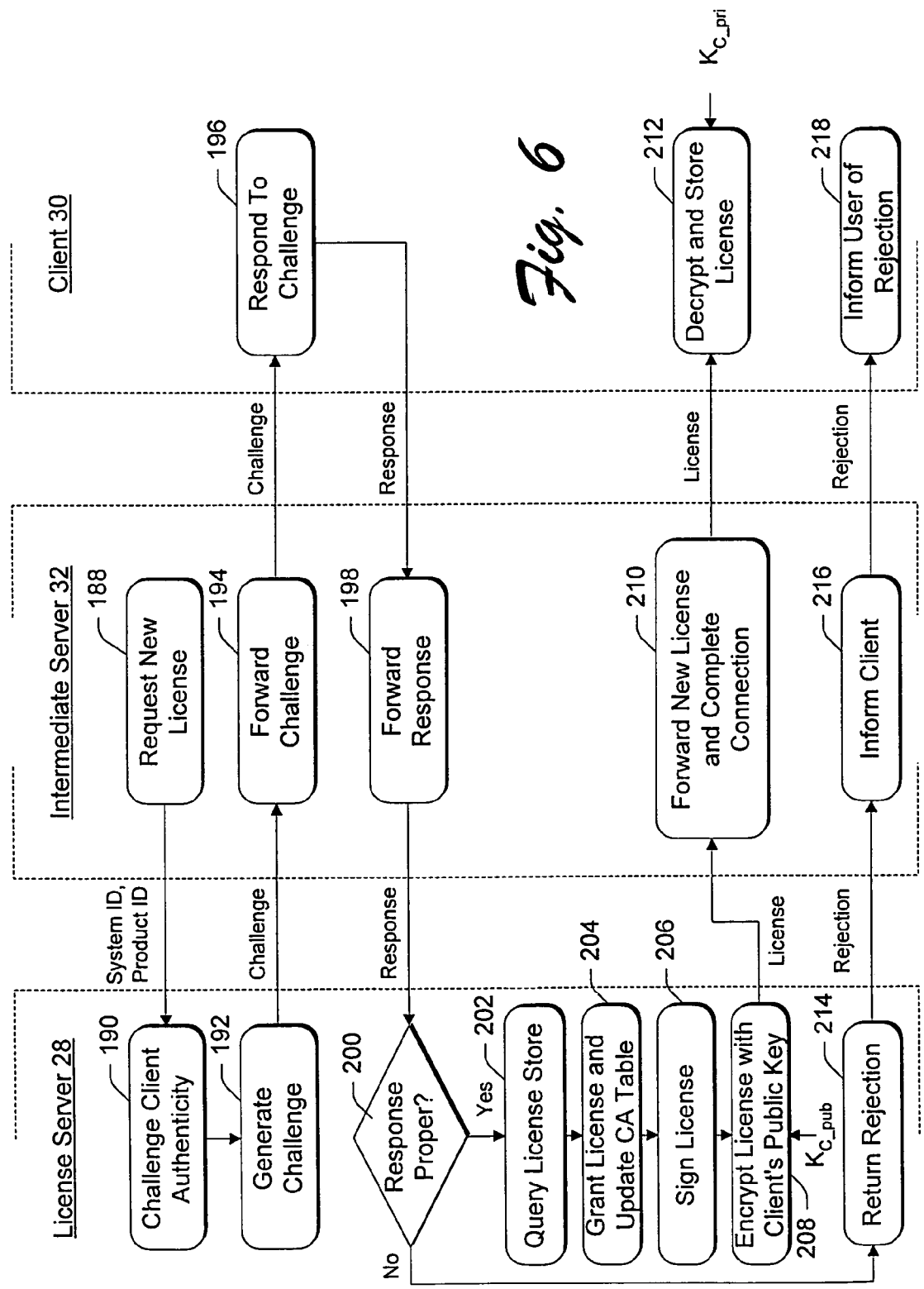
FIG. 6 shows steps in a method for distributing a software license to a client.

FIG. 6 shows steps in a method for granting a new software license from the license server 28 to the client 30. The method begins with step 188, which is the same new license request discussed above with respect to step 188 of FIG. 5. The new license request includes the client's system ID and the product ID. In response to the request, the license server 28 initiates a client challenge to determine who the client is and what platform it is running (step 190). In general, this involves generating a challenge and sending it to the intermediate server 32 (step 192). The intermediate server 32 forwards the challenge to the client 30 (step 194).

At step 196 in FIG. 6, the client responds to the challenge in a manner that provides trusted information about client, including the platform type and the client's public key. The response is passed to the intermediate server 32, which forwards it to the license server 28 (step 198).

At step 200 in FIG. 6, the license server determines whether the response is proper, and hence, whether the client is authentic. If the client is authenticated (i.e., the "yes" branch from step 200), the license server proceeds with granting a software license. The license server 28 first queries the secure license store 112 to determine if a license for that client has already been issued (step 202). This procedure accommodates the case in which the client has lost its valid software license. If a non-expired license is found, the license server 28 forwards it to the client 30.

Otherwise, the license server 28 attempts to allocate a software license for the client, assuming a non-assigned license still exists in the license pack. If a license can be allocated, the license server 28 retrieves a software license that is appropriate for the client's platform from the secure software store 112 and grants the software license to the client (step 204 in FIG. 6). The license server 28 adds a record to the client assignment table 116 and the corresponding number assigned field is updated to reflect one additional allocation.

To prevent the software license from being copied from one client machine to another, the software license is assigned to the specific client by including its client ID within the license. The software license also has a corresponding license ID that is associated with the client ID in the client assignment table 116 in the secure license store 112 at the license server. The contents of the license are described above in Table 5.

The license server 32 digitally signs the software license (step 206) and encrypts it using the client's public key $K_{C\_pub}$ (step 208), thereby binding the license to the client. The encrypted license is forwarded to the intermediate server 32, which passes it on to the client 30 and completes the connection (step 210). By encrypting the license, the client or the license server need not trust the intermediate server because the intermediate server cannot maliciously utilize or modify the encrypted license. It also removes the risk of a rogue server masquerading as intermediate server.

At step 212, the client 30 decrypts the license using the client's private key $K_{C\_pri}$ and stores the license in the license cache 136.

In the event that the client's response to the challenge is deemed improper (i.e., the "no" branch from step 200), the license server returns a rejection notice (step 214 in FIG. 6). This rejection notice is passed on by the intermediate server 32 (step 216) and used to inform the user (step 218).

Platform Challenge

Figure 7:
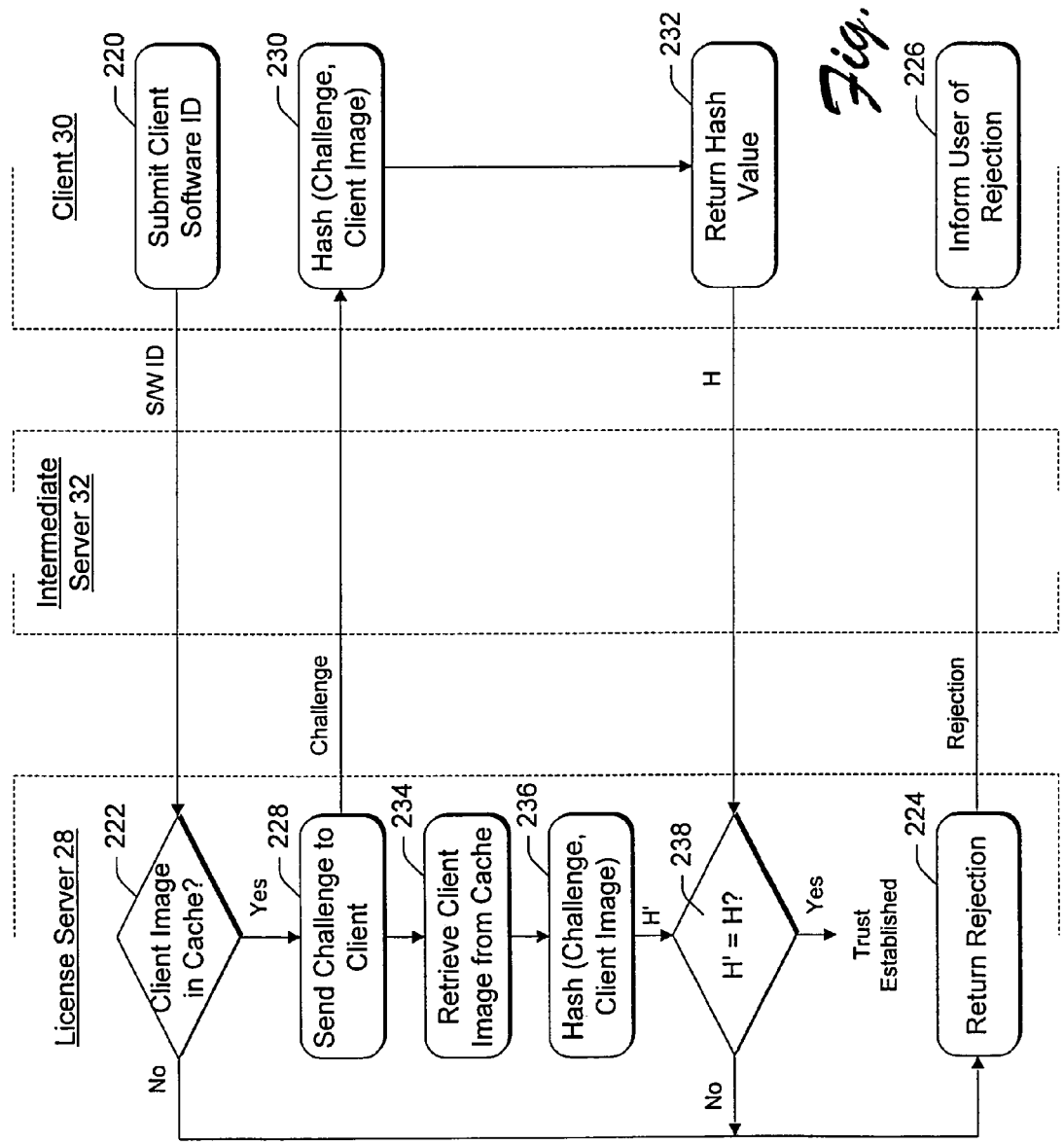
FIG. 7 shows steps in a method for challenging a client prior to granting a software license to that client.

FIG. 7 shows a more detailed method for providing a platform challenge to the client. In this illustration, the intermediate server 32 is shown as the go between, with the forwarding steps omitted for ease of description.

An aspect of platform validation is establishing the authenticity of the client. The system utilizes the client's executable image to generate a digital signature that uniquely identifies the client. As noted above, the client's executable image is available to the license server 28 because it is stored in the client image cache 120.

When a client requests a software license from the license server, the client submits a client software ID (step 220 in FIG. 7). The software ID is assigned by the software manufacturer/vendor to be unique for each client release. The client software ID is a bit field that contains a platform identifier, a vendor identifier, and a client revision field. The arrangement of the bits depends on how many platforms and clients are supported.

At step 222, the license server 28 uses the software ID to lookup the client's executable image in the client image cache 120. If the image is not present in the cache (i.e., the "no" branch from step 222), the client is denied a software license and a rejection is returned to the client and informs the user (steps 224 and 226).

On the other hand, if an image is present (i.e., the "yes" branch from step 222), the license server 28 sends a challenge to the client 30 to establish a trust relationship with the client (step 228). The challenge is preferably a 128-bit random number.

The client 30 applies a one-way function to a combination of the challenge and the client's image (step 230). Preferably, the client concatenates the challenge and the client image and computes a hash value, as follows:

Challenge Response=Hash(challenge|client image|challenge)

The client 30 sends the challenge response (i.e., the hash value) back to the license server 28 (step 232).

Meanwhile, the license server 28 uses the software ID to retrieve a reference copy of the client image from its cache 120 (step 234 in FIG. 7). The license server then computes a test hash value using the same hash function, and a concatenated version of the same 128-bit challenge and the client image retrieved from the cache 120 (step 236).

The license server 28 compares the test hash value (H') with the hash value (H) returned from the client (step 238). If the two values are the same, the client's platform information is extracted from the client software ID and a trust relationship established (i.e., the "yes" branch from step 238). Otherwise, the client is denied a software license and a rejection is returned to the client (i.e., the "no" branch from step 238).

Upgrading Licenses

The process for upgrading an existing license is very similar to the license distribution process. The primary difference is that a platform challenge is not performed because a valid, digitally signed license is presented to the license server.

Figure 8:
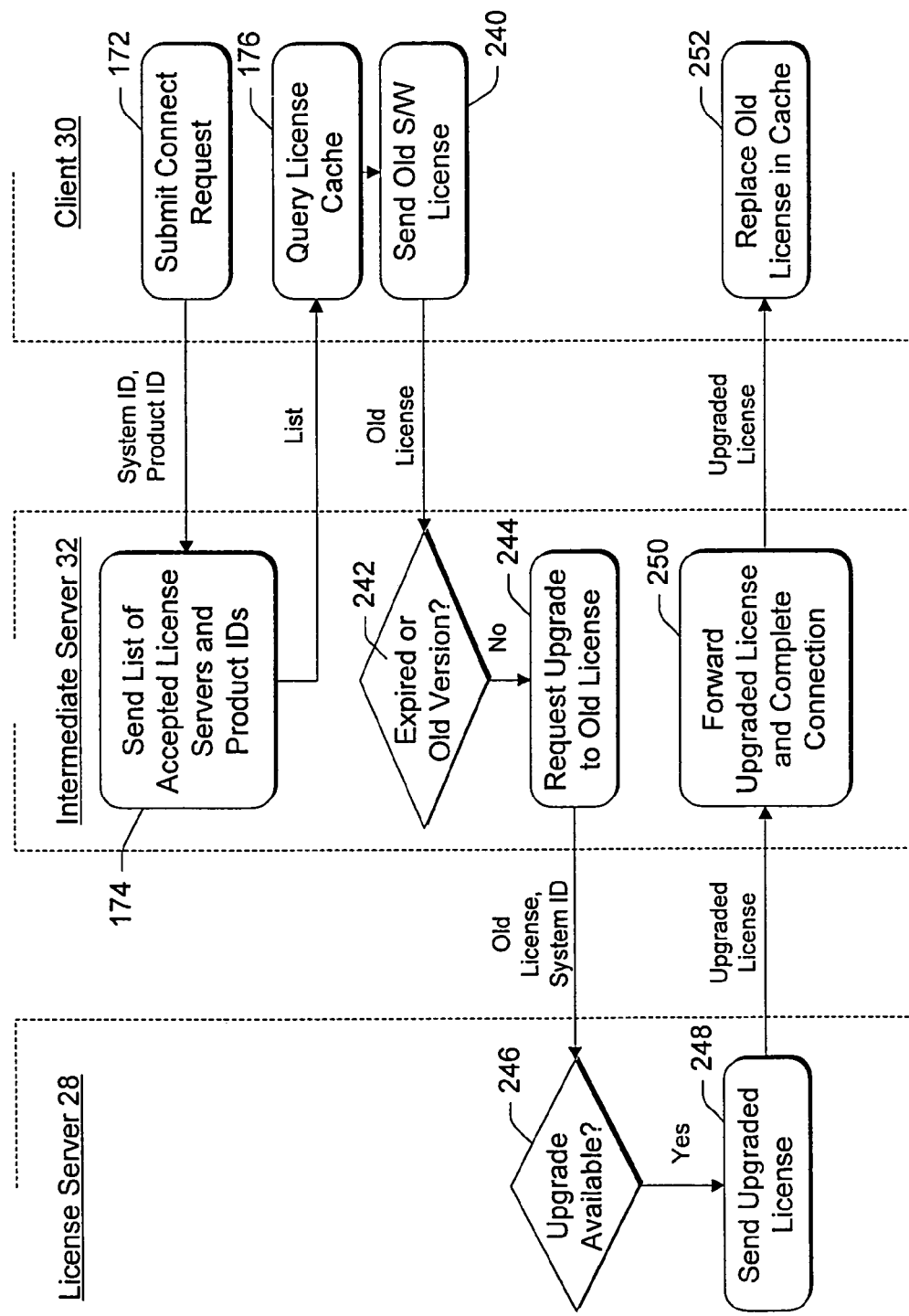
FIG. 8 shows steps in a method for upgrading a software license.

FIG. 8 shows the steps in a method for upgrading an existing license. Steps 172–176 are identical to those defined above with respect to FIG. 5. At step 240, the client 30 submits a valid software license to the intermediate server 32.

At step 242 in FIG. 8, the intermediate server 32 determines whether the license has expired and/or is for an older version. Assuming it meets one of these conditions, the intermediate server automatically contacts the license server 28 and requests that the license be upgraded (step 244). The intermediate server passes the old license and the client's system ID to the license server 28.

The license server 28 validates the old license and extracts the license's ID, which is used as an index into the client assignment table 116 in the secure license store 112. The license server 28 examines the table 116 to determine whether an upgrade is available (step 246). If so, the license server 28 upgrades a record in the table, consuming one upgrade license, and returns an upgraded license to the intermediate server 32 (step 248). The intermediate server 32 forwards the upgraded license to the client and completes the connection (step 250). The client replaces the old license with the upgraded one in the license cache 136 (step 252).

As a matter of policy, licenses are assumed to be backward compatible. That is, a next generation 5.X license is always accepted by a current generation 4.X server. This allows a customer to have a seamless mix of different servers. Variances in the licenses internal data structures are taken into account by including a version number within the license.

Temporary Licenses

Suppose a client 30 requests a software license, but the license server 28 does not have an available license in the secure license store. In this case, the license server 28 issues a temporary license that is valid for a finite duration (e.g., 60 days).

With reference to FIG. 3, the requesting client submits its system ID 142 to the intermediate server 32, which forwards the client's system ID 142 to the license server 28. The license server 28 generates a temporary license and associates it with the client's system ID 142. The temporary license is passed back through the intermediate server 32 to the client 30. Each time the client presents the temporary license, a new license request is generated. Once the license server has an available license (e.g., the license server purchased additional licenses from the license clearinghouse), it issues a permanent license to the client. Temporary licenses are replaced only by a valid permanent license.

When a temporary license expires, the license server 28 no longer accepts it and services are denied. Furthermore, the client is only granted one temporary license and will not be permitted to request a second temporary. If a client attempts to request a second temporary license, the license server will detect the system ID and recognize that this ID is already associated with a previously issued temporary license. The license server 28 simply returns the previously issued temporary license, which is inoperable because it has expired.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for distributing software licenses to clients so that the clients may legally execute underlying software to which the software licenses pertains, the computer-implemented method comprising electronically issuing the software licenses as digital certificates that are distributed in one-to-one correlation with individual clients and traced to an issuing authority, and issuing a software license to a particular client only if a client executable image received from the particular client matches a stored client executable image for the particular client.

2. A computer-readable medium having computer readable instructions for performing the method as recited in claim 1.

3. A license server for execution embodied on a computer-readable medium for issuing individual software licenses from a software pack received from a licensing clearinghouse, comprising:
a license store to store the license software pack of individual software licenses, each software license having an associated license ID;
a request handler to receive a request for software license from a client;
a client authenticating module to determine, based on a client executable image received from the client, whether the client is authentic and can receive a software license; and
a granting module to grant a software license from the license store to an authenticated client and to associate the license ID with the authenticated client.

4. A license server as recited in claim 3, wherein the authenticating module determines an operating platform of the client.

5. A license server as recited in claim 3, wherein the granting module encrypts the software license using a public key of the authenticated client.

6. A license server as recited in claim 3, wherein the software license contains at least one of the following items:
a version indicator of a software license;
a license ID;
a client ID that identifies the authenticated client;
an issue date on which the license is issued to the client;
a platform type of the client's operating platform for which the software license can be used;
an expiration date on which the software license will expire; and
a product ID that identifies a product with which the software licenses can be used.

7. A license server as recited in claim 3, further comprising a license pack table to store information pertaining to the license pack that is stored in the license store.

8. A program embodied on a computer-readable medium, comprising:
a code segment to receive a license pack from a license generator, the license pack containing a set of one or more individual software licenses;
a code segment to validate the license pack;
a code segment to store the software licenses;
a code segment, responsive to a request for a software license from a client, to determine, based on a client executable image received from the client, whether the client is authentic and can re a software license;
a code segment to grant a software license to an authenticated client, the software license containing a license ID; and a code segment to associate the license ID with the authenticated client.

9. A client computer, comprising:

a license cache to store one or more software licenses;

a license requestor to request a software license from a license server;

a challenge handler to handle an authenticity challenge from the license server, the challenge handler computing a challenge response that contains a client executable image that is used by the license server to evaluate whether the client is authentic and can be licensed; and whereupon authentication by the license server and granting of a software license, the license requestor receiving the software license form the license server and storing the software license in the license cache.

10. A program embodied on a computer-readable medium, comprising:

a code segment to receive an authenticity challenge from a license server that distributes software licenses;

a code segment to compute a challenge response that contains a client executable image that is used by the license server to evaluate whether the client is authentic and can be licensed; and a code segment to store the software license granted by the license server in an event that the client is deemed authentic.

11. A client computer, comprising:

memory for storing information correspond to one or more received software licenses;

a license requestor to request a software license from a license server;

a challenge handler to handle an authenticity challenge from the license server, the challenge handler computing a challenge response that contains a client executable image that is used by the license server to evaluate whether the client is authentic an can be licensed, wherein the challenge contains a random number, and the challenge handler computes that challenge response by concatenating the random number with the client executable image to form a concatenated value and hashing the concatenated value; and wherein, upon authentication by the license server and granting of a software license, the license requestor receiving the software license from the license server saves in the memory information corresponding to the received license.

12. The client computer of claim 11, wherein the memory comprises non-volatile memory.

13. The client computer of claim 11, wherein the saved information corresponding to the received license comprises the received license.

14. The client computer of claim 11, wherein the saved information corresponding to the received license comprises an indication that a specific license was granted.

15. A computer-readable medium, having computer readable instruction for:

requesting a software license from a license server;

receiving an authenticity challenge form the license server;

computing a challenge response that contains a client executable image that is used by the license server to evaluate whether the client is authentic and can be licensed; and receiving, upon authentication by the license server and granting of a software license, the software license from the license server and storing information corresponding to the software license in a memory.

16. The computer-readable medium of claim 15, wherein the stored information corresponding to the received software license comprises the received software license.

17. The computer-readable medium of claim 15, wherein the stored information corresponding to the received software license comprises an indication that a specific license was granted.

18. A client computer, comprising:

means for storing information corresponding to one or more received software licenses;

means for requesting a software license from a license server;

means for handling an authenticity challenge from the license server, the means for handling computing a challenge response that contains a client executable image that is used by the license server to evaluate whether the client is authentic and can be licensed, wherein the challenge contains a random number, and the means for handling computes the challenge response by concatenating the random number with the client executable image to form a concatenated value and hashing the concatenated value; and wherein, upon authentication by the license server and granting of a software license, the means for requesting receiving the software license from the license server saves in the memory information corresponding to the received license.

19. The client computer of claim 18, wherein the saved information corresponding to the received license comprises the received license.

20. The client computer of claim 18, wherein the saved information corresponding to the received license comprises an indication that a specific license was granted.

* * * * *